US011664552B2

(12) United States Patent
Wang et al.

(10) Patent No.: US 11,664,552 B2
(45) Date of Patent: May 30, 2023

(54) BATTERY COVERING STRUCTURE WITH REPLACEABLE TERMINALS

(71) Applicants: Dexi Wang, Hubei (CN); Ronghua Chen, Guangdong (CN)

(72) Inventors: Dexi Wang, Hubei (CN); Ronghua Chen, Guangdong (CN)

(73) Assignees: Guangzhou Kage Power Industry Co., Ltd., Guangdong (CN); Guangzhou Mintong Trading Co., Ltd., Guangdong (CN)

( * ) Notice: Subject to any disclaimer, the term of this patent is extended or adjusted under 35 U.S.C. 154(b) by 1080 days.

(21) Appl. No.: 16/383,682

(22) Filed: Apr. 15, 2019

(65) Prior Publication Data

US 2020/0106080 A1    Apr. 2, 2020

(30) Foreign Application Priority Data

Sep. 30, 2018    (CN) .......................... 201811162672.7

(51) Int. Cl.
| | |
|---|---|
| *H01M 50/147* | (2021.01) |
| *H01M 50/553* | (2021.01) |
| *H01M 50/567* | (2021.01) |
| *H01M 50/55* | (2021.01) |

(52) U.S. Cl.
CPC ......... *H01M 50/147* (2021.01); *H01M 50/55* (2021.01); *H01M 50/553* (2021.01); *H01M 50/567* (2021.01); *H01M 2220/20* (2013.01)

(58) Field of Classification Search
CPC ............. H01M 50/543; H01M 50/147; H01M 50/553; H01M 50/55
See application file for complete search history.

(56) References Cited

FOREIGN PATENT DOCUMENTS

JP    2015197993 A    * 11/2015

OTHER PUBLICATIONS

Takashi et al., JP 2015-197993 A Espacenet machine translation, 2015 (Year: 2015).*

* cited by examiner

*Primary Examiner* — Adam A Arciero

(57) ABSTRACT

The invention discloses a battery covering structure with replaceable terminals, comprising a covering and terminals, the terminals are located on the covering, and the covering is used for connecting with the battery body, the terminals are detachably connected with the covering. The invention makes the replacement of terminals convenient and quick, which enables the structure to be matched with various types of automobiles and motorcycles, and is beneficial to improving the applicability of battery.

8 Claims, 4 Drawing Sheets

BATTERY COVERING STRUCTURE WITH REPLACEABLE TERMINALS

FIELD OF THE INVENTION

The invention relates to a technology of battery, and in particular, to a battery covering structure with replaceable terminals.

DESCRIPTION OF THE RELATED ART

As a rechargeable battery, the battery is often used in automobiles and motorcycles. At present, there are many models of automobiles and motorcycles on the international market, and each model has various requirements for the performance and installation dimensions of the battery; therefore, the specifications of the required battery models are extremely numerous. However, the terminals in the prior art are fixed on the battery covering, and the terminals cannot be replaced, so that it fails to be matched with various types of automobiles and motorcycles, and the applicability of battery is low.

SUMMARY OF THE INVENTION

In order to overcome the deficiencies in the prior art, the objective of the invention is to provide a battery covering structure with replaceable terminals, so that the replacement of terminals is convenient and quick, which enables the structure to be matched with various types of automobiles and motorcycles, and is beneficial to improving the applicability of battery.

The invention is realized by adopting the following technical solutions:

a battery covering structure with replaceable terminals, comprising a covering and terminals, the terminals are located on the covering, and the covering is used for connecting with the battery body, wherein the terminals are detachably connected with the covering.

Further, the number of the terminals is two, and the two terminals are respectively located on both ends of the covering; the terminals are in clamping connection with the covering, and the covering is provided with a connecting groove; the terminal is provided with a connecting inserted block, and the connecting inserted block is in clamping connection with the connecting groove.

Further, the structure further comprises a lead plate and a mounting plate; the lead plate is located between the terminals and the covering, and the covering is provided with a mounting groove; one end of the lead plate is provided with a first conductive block, the first conductive block is inserted into the mounting groove, and the first conductive block is used for electrically connecting with the battery body; one side of the lead plate is provided with a second conductive block, the second conductive block is in a clearance fit with the covering, and the second conductive block is used for electrically connecting with the battery body; the terminals are locked to the lead plate via connecting screws; the mounting plate is located between the lead plate and the covering; the mounting plate is provided with nut through holes, the lead plate is provided with fixing through holes, and the terminal is provided with connecting through holes; the connecting screw passes through the connecting through hole, the fixing through hole and the nut through hole in sequence, and the connecting screw is connected to the nut through hole via threads.

Further, the nut through holes are elliptical holes.

Further, the terminals comprise first terminals and second terminals, and the first terminals and the second terminals are spaced apart and are both located on the lead plate; the connecting through hole is located on one end of the first terminal and the second terminal, and the first terminal and the second terminal are respectively locked to the lead plate via connecting screws; the connecting inserted block is located on the other side of the first terminal and the second terminal, and the first terminal and the second terminal are respectively in clamping connection with the covering.

Further, the first terminal is provided with at least two connecting through holes, the second terminal is provided with at least two connecting through holes, and the number of the connecting screws is matched with the number of the connecting through holes.

Further, the first terminal is further provided with a first terminal port and a second terminal port; the plane of the first terminal port intersects with the plane of the second terminal port, and the axis of the first terminal port and the axis of the second terminal port are located on the same plane.

Further, the second terminal is further provided with a third terminal port and a fourth terminal port; the plane of the third terminal port intersects with the plane of the fourth terminal port; the third terminal port and the fourth terminal port are staggered such that the axis of the third terminal port and the axis of the fourth terminal port are located on different planes.

Further, the two terminals comprise two first terminals and two second terminals; the shape of the covering is a rectangle, and the two first terminals and the two second terminals are respectively located at four top corners of the surface of the covering; the number of the connecting grooves is four, and the four connecting grooves are located at four top corners of the surface of the covering.

Further, the two first terminals are disposed at two adjacent corners of the surface of the covering, and the two second terminals are disposed at two adjacent corners of the surface of the covering.

Compared with the prior art, the invention has the advantageous effects as follows:

the invention enables the covering to be connected to the battery body. Specifically, the covering is disposed on the battery body, the covering is provided with terminals for connecting with automobiles and motorcycles, so as to realize the conductive connection between the battery and the circuit system of automobiles and the motorcycles. The terminals and the covering are connected in a detachable manner, so that the replacement of terminals is convenient and quick, which enables the structure to be matched with various types of automobiles and motorcycles, and is beneficial to improving the applicability of battery.

In the figures, 1 refers to the battery body; 2 refers to the covering; 3 refers to the connecting groove; 4 refers to the connecting inserted block; 5 refers to the lead plate; 6 refers to the mounting plate; 7 refers to the mounting groove; 8 refers to the connecting screw; 9 refers to the nut through hole; 10 refers to the connecting through hole; 11 refers to the fixing through hole; 12 refers to the first terminal; 13 refers to the second terminal; 14 refers to the first terminal port; 15 refers to the second terminal port; 16 refers to the third terminal port; 17 refers to the fourth terminal port; 18 refers to the first conductive block; 19 refers to the second conductive block.

DETAILED DESCRIPTION OF THE PREFERRED EMBODIMENTS

The invention is further described hereinafter with reference to the accompanying drawings and preferred embodiments. It should be noted that a new embodiment may be formed by any combination between the embodiments or technical features described below without conflict with each other.

Figure 1:
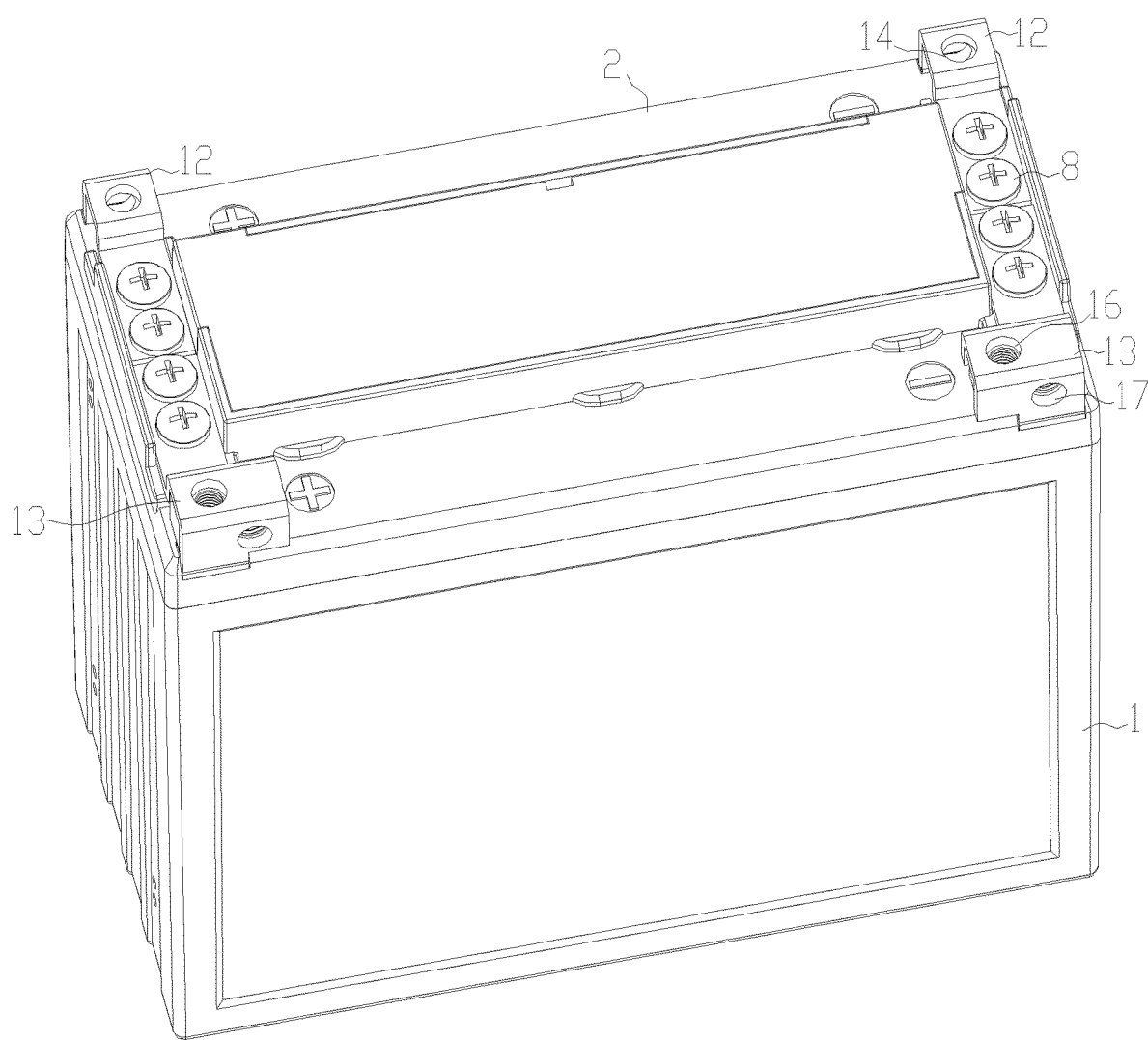
FIG. 1 is a schematic view illustrating the structure of the battery.
Figure 2:
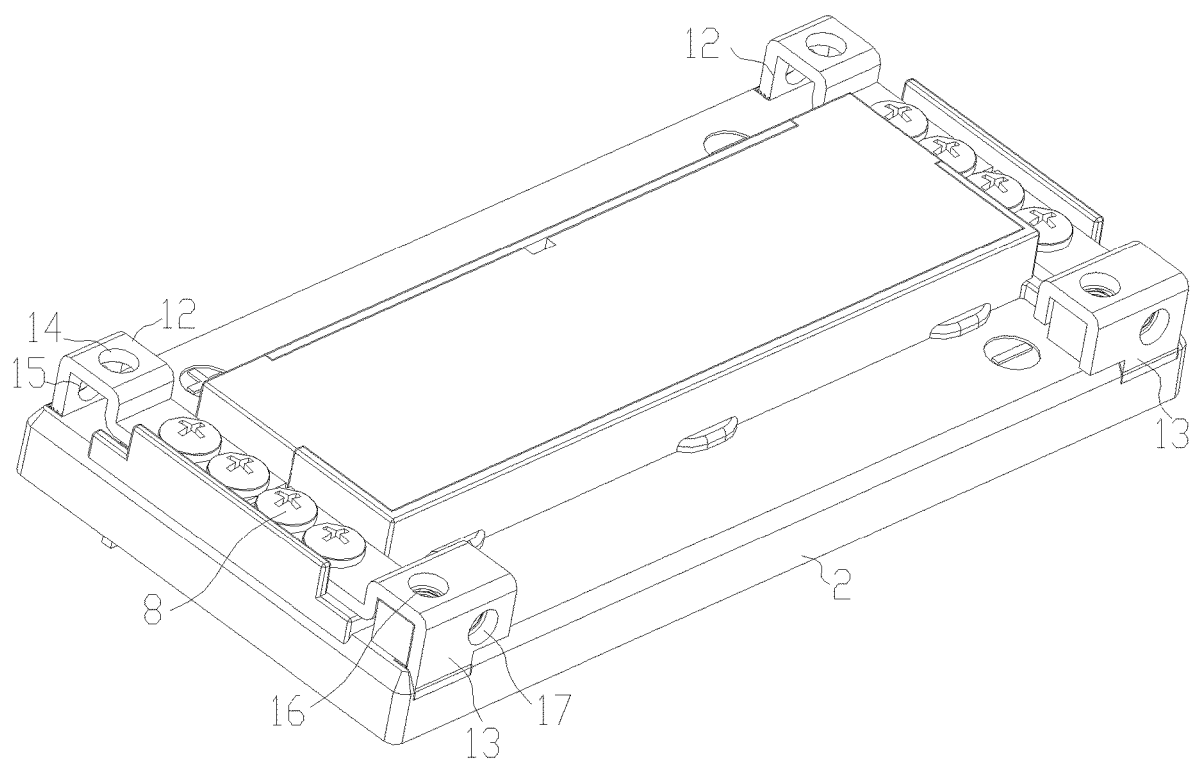
FIG. 2 is a schematic view illustrating the structure of the invention form one angle.
Figure 3:
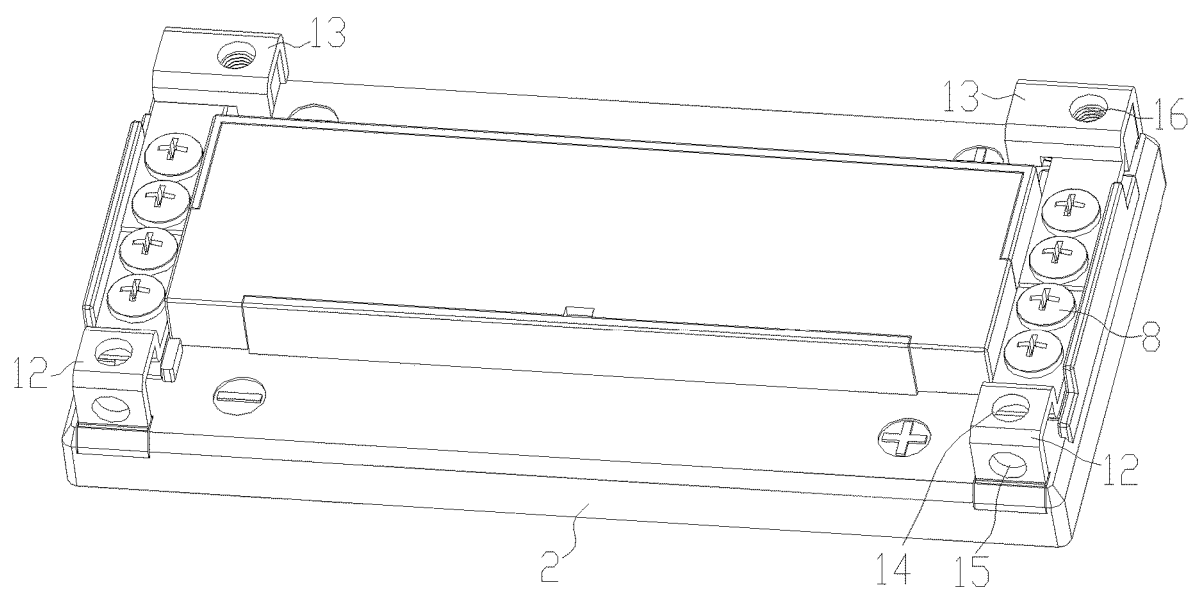
FIG. 3 is a schematic view illustrating the structure of the invention form another angle.
Figure 4:
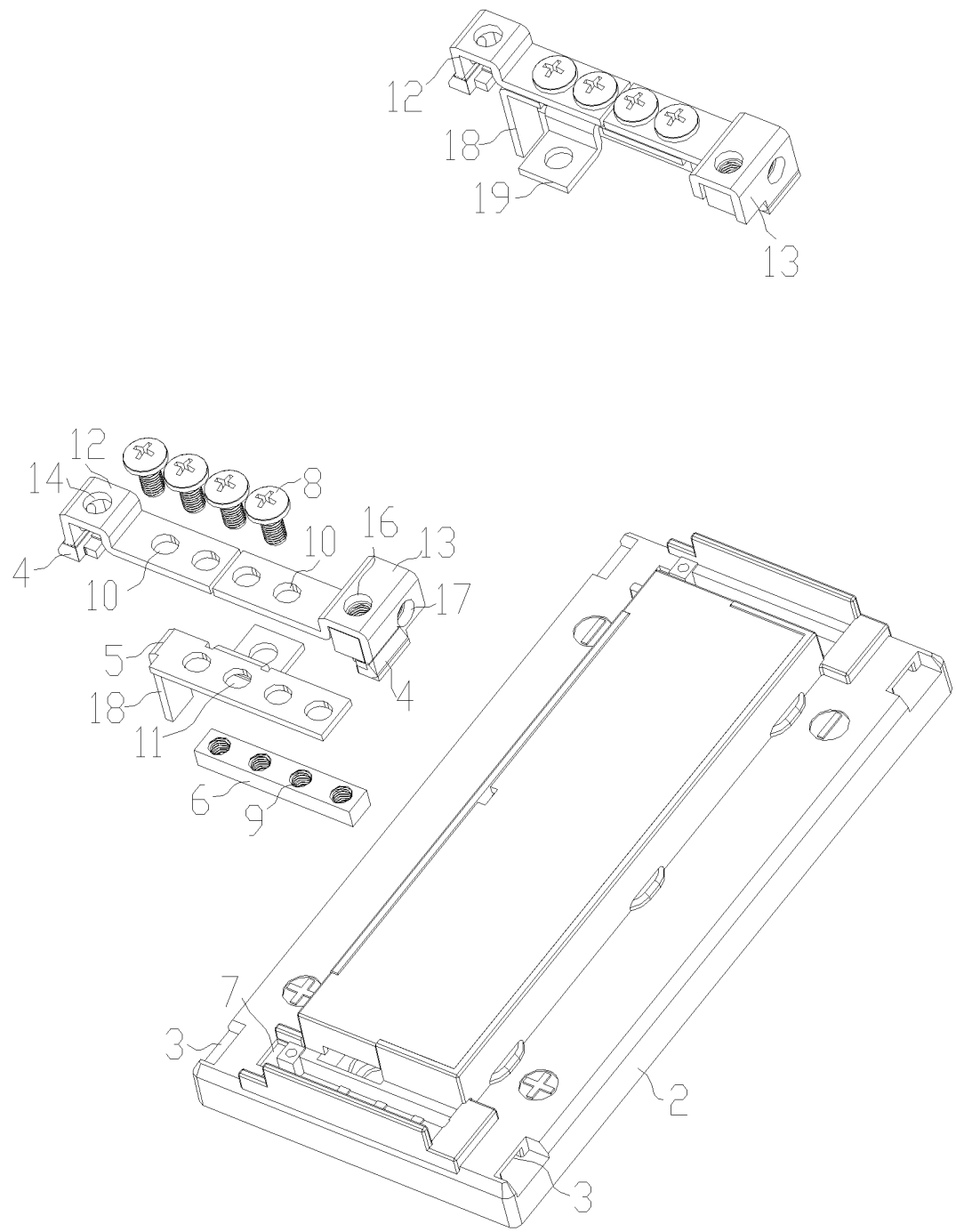
FIG. 4 is a schematic view illustrating the exploded structure of the invention.

A battery covering structure with replaceable terminals as shown in FIG. 1-4, comprising a covering 2 and terminals, the terminals are located on the covering 2, and the covering 2 is used for connecting with the battery body 1, wherein the terminals are detachably connected with the covering 2.

The battery referred to in the embodiment may be a lead-acid battery, a lithium-ion hybrid battery, or other types of batteries. The invention enables the covering 2 to be connected to the battery body 1. Specifically, the covering 2 is disposed on the battery body 1, the covering 2 is provided with terminals for connecting with automobiles and motorcycles, so as to realize the conductive connection between the battery and the circuit system of automobiles and the motorcycles. As a preferred embodiment of the embodiment, the terminals and the covering 2 are connected in a detachable manner, so that the replacement of terminals is convenient and quick, which enables the structure to be matched with various types of automobiles and motorcycles, and is beneficial to improving the applicability of battery.

Specifically, the number of the terminals is two, and the two terminals are respectively located on both ends of the covering 2; the terminals are in clamping connection with the covering 2, and the covering 2 is provided with a connecting groove 3; the terminal is provided with a connecting inserted block 4, and the connecting inserted block 4 is in clamping connection with the connecting groove 3, which facilitates disassembly and assembly.

It should be emphasized that the structure further comprises a lead plate 5 and a mounting plate 6; the lead plate 5 is located between the terminals and the covering 2, and the covering 2 is provided with a mounting groove 7; one end of the lead plate 5 is provided with a first conductive block 18, the first conductive block 18 is inserted into the mounting groove 7, and the first conductive block 18 is used for electrically connecting with the battery body 1; one side of the lead plate 5 is provided with a second conductive block 19, the second conductive block 19 is in a clearance fit with the covering 2; specifically, an L-shaped mating portion is formed on the second conductive block 19, and a hole for the lead pillar for the lead-acid battery to pass through is formed on the L-shaped mating portion, and the lead pillar penetrates the hole, so that the second conductive block 19 is electrically connected to the lead-acid battery in the battery body 1, which enables the lead plate 5 to be electrically connected to the battery body 1. The terminals are locked to the lead plate 5 via connecting screws 8; the mounting plate 6 is located between the lead plate 5 and the covering 2; the mounting plate 6 is provided with nut through holes 9, the lead plate 5 is provided with fixing through holes 11, and the terminal is provided with connecting through holes 10; the connecting screw 8 passes through the connecting through hole 10, the fixing through hole 11 and the nut through hole 9 in sequence, and the connecting screw 8 is connected to the nut through hole 9 via threads, so that the replacement of terminals is convenient and quick.

It is worth mentioning that the nut through holes 9 are elliptical holes; specifically, the nut through holes 9 are provided with nuts, and the nuts are connected to the connecting screw 8 via threads; the nut through holes 9 are formed as elliptical, which helps to avoid the eccentricity of the nuts and adapts to the tolerance.

It should be noted that the terminals comprise first terminals 12 and second terminals 13, and the first terminals 12 and the second terminals 13 may be positive terminals and negative terminals, respectively; the first terminals 12 and the second terminals 13 are spaced apart and are both located on the lead plate 5; the connecting through hole 10 is located on one end of the first terminal 12 and the second terminal 13, and the first terminal 12 and the second terminal 13 are respectively locked to the lead plate 5 via connecting screws 8; the connecting inserted block 4 is located on the other side of the first terminal 12 and the second terminal 13, and the first terminal 12 and the second terminal 13 are respectively in clamping connection with the covering 2. In the embodiment, the first terminal 12 and the second terminal 13 are arranged apart from each other; specifically, there is a certain gap between the first terminal 12 and the second terminal 13, and the first terminal 12, the second terminal 13 and the covering 2 are connected in a detachable manner. The gap between the first terminal 12 and the second terminal 13 can be adjusted to ensure that the sidewalls of the first terminal 12 and the second terminal 13 do not protrude from the outer wall of the battery, which enables the first terminal 12 and the second terminal 13 to be matched with the batteries of different sizes.

More specifically, the first terminal 12 is provided with at least two connecting through holes 10, the second terminal 13 is provided with at least two connecting through holes 10, and the number of the connecting screws 8 is matched with the number of the connecting through holes 10. If the first terminal 12 and the second terminal 13 are provided with only one connecting through hole 10, then the number of the connecting screws 8 is matched with it; that is, the first terminal 12 is locked to the lead plate 5 via one connecting screw 8, and the second terminal 13 is locked to the lead plate 5 via one connecting screw 8, so that the first terminal 12 and the second terminal 13 are easily rotated on the lead plate 5 around the connecting screw 8, which enables that the bonding strength between the first terminal 12, the second terminal 13 and the lead plate 5 is low, and the electrical conductivity is low, resulting in an increase in current and easy heat generation. So in the embodiment, the first terminal 12 is provided with at least two connecting through holes 10, the second terminal 13 is provided with at least two connecting through holes 10, which enables the first terminal 12 to be locked to the lead plate 5 via at least two connecting screws 8, and the second terminal 13 to be locked to the lead plate 5 via at least two connecting screws 8, so that the connection structure of the first terminal 12, the second terminal 13 and the lead plate 5 is firm, and the rotation is less likely to occur, and the conductivity of the first terminal 12 and the second terminal 13 is high, excessive current can be avoided to cause heat generation. It should be understood that the number of the fixing through holes 11 and the nut through holes 9 is matched with the number of the connecting through holes 10; that is, the number of the fixing through holes 11 and the nut through holes 9 is respectively at least four. In the embodiment, the mounting plate 6 is provide with at least four nut through holes 9, which fails to achieve the link between the adjacent two nut through holes 9, so that it is possible to avoid that the current is increased due to the link between the two nut through holes 9 and the heat is easily generated, which is advantageous for increasing the strength of the structure of the mounting plate 6.

Preferably, the first terminal 12 is further provided with a first terminal port 14 and a second terminal port 15; the plane of the first terminal port 14 intersects with the plane of the second terminal port 15, and the axis of the first terminal port 14 and the axis of the second terminal port 15 are located on the same plane.

A more preferred embodiment is, the second terminal 13 is further provided with a third terminal port 16 and a fourth terminal port 17; the plane of the third terminal port 16 intersects with the plane of the fourth terminal port 17; preferably, the plane of the third terminal port 16 is vertical to the plane of the fourth terminal port 17, the third terminal port 16 and the fourth terminal port 17 are staggered such that the axis of the third terminal port 16 and the axis of the fourth terminal port 17 are located on different planes.

Therefore, the first terminal port 14 and the second terminal port 15 are arranged on the first terminal 12 in the manner above, and the first terminal port 14 and the second terminal port 15 are used to be connected with the wiring card of automobiles and motorcycles, so that the first terminal 12 is electrically connected to automobiles and motorcycles; the third terminal port 16 and the fourth terminal port 17 are arranged on the second terminal 13 in the manner above, and the third terminal port 16 and the fourth terminal port 17 are used to be connected with the wiring card of automobiles and motorcycles, so that the second terminal 13 is electrically connected to automobiles and motorcycles. The structure of the first terminal 12 and the second terminal 13 is more flexible, so that the first terminal 12 and the second terminal 13 are more convenient to be wired, that is, the connection with automobiles and motorcycles is more convenient, and the applicability is enhanced. More specifically, in the embodiment, the first terminal 12 and the second terminal 13 can all be made of the 2.5 mm copper plate, to ensure that the connecting through holes 10, the first terminal port 14, the second terminal port 15, the third terminal port 16 and the fourth terminal port 17 have a sufficient distance to facilitate the installation and to contribute to the improvement of the electrical conductivity.

More specifically, the two terminals comprise two first terminals 12 and two second terminals 13; the shape of the covering 2 is a rectangle, and the two first terminals 12 and the two second terminals 13 are respectively located at four top corners of the surface of the covering 2; the number of the connecting grooves 3 is four, and the four connecting grooves 3 are located at four top corners of the surface of the covering 2.

Furthermore, the two first terminals 12 are disposed at two adjacent corners of the surface of the covering 2, and the two second terminals 13 are disposed at two adjacent corners of the surface of the covering 2.

To sum up, the structure is provided with two first terminals 12 and two second terminals 13, and can be wired with multiple ports, which is convenient and quick. The structure can be adapted to high-end models with more electric appliances, and has higher applicability and meets the requirements of electrical conductivity and strength.

The above embodiments are merely preferred embodiments of the invention, and the protection scope of the invention is no limited thereto. Any non-substantial substitutions and alternatives made by those skilled in the art based on the invention shall fall within the protection scope of the invention as claimed.

The invention claimed is:

1. A battery covering structure with replaceable terminals, comprising a covering and terminals, the terminals are located on the covering, and the covering is used for connecting with the battery body, wherein the terminals are detachably connected with the covering:

the number of the terminals is two, and the two terminals are respectively located on both ends of the covering; the terminals are in clamping connection with the covering, and the covering is provided with a connecting groove; the terminals are provided with a connecting inserted block, and the connecting inserted block is in clamping connection with the connecting groove, wherein the structure further comprises a lead plate and a mounting plate; the lead plate is located between the terminals and the covering, and the covering is provided with a mounting groove; one end of the lead plate is provided with a first conductive block, the first conductive block is inserted into the mounting groove, and the first conductive block is used for electrically connecting with the battery body; one side of the lead plate is provided with a second conductive block, the second conductive block is in a clearance fit with the covering, and the second conductive block is used for electrically connecting with the battery body; the terminals are locked to the lead plate via connecting screws; the mounting plate is located between the lead plate and the covering; the mounting plate is provided with nut through holes, the lead plate is provided with fixing through holes, and the terminal is provided with connecting through holes; the connecting screws passes through the connecting through holes, the fixing through holes and the nut through holes in sequence, and the connecting screw is connected to the nut through holes via threads.

2. The battery covering structure with replaceable terminals according to claim 1, wherein the nut through holes are elliptical holes.

3. The battery covering structure with replaceable terminals according to claim 1, wherein the terminals comprise first terminals and second terminals, and the first terminals and the second terminals are spaced apart and are both located on the lead plate; the connecting through holes are located on one end of the first terminals and the second terminals, and the first terminals and the second terminal are respectively locked to the lead plate via connecting screws; the connecting inserted block is located on the other side of the first terminal and the second terminals and the first terminals, and the second terminals are respectively in clamping connection with the covering.

4. The battery covering structure with replaceable terminals according to claim 3, wherein the first terminals are provided with at least two connecting through holes, the second terminals are provided with at least two connecting through holes, and the number of the connecting screws is matched with the number of the connecting through holes.

5. The battery covering structure with replaceable terminals according to claim 3, wherein the first terminals are further provided with first terminal ports and second terminal ports; the plane of the first terminal ports intersects with the plane of the second terminal ports, and the axis of the first terminal ports and the axis of the second terminal ports are located on the same plane.

6. The battery covering structure with replaceable terminals according to claim 3, wherein the second terminals are further provided with third terminal ports and fourth terminal ports; the plane of the third terminal ports intersects with the plane of the fourth terminal ports; the third terminal ports and the fourth terminal ports are staggered such that the axis of the third terminal ports and the axis of the fourth terminal ports are located on different planes.

7. The battery covering structure with replaceable terminals according to claim 3, wherein the first terminals and second terminals comprise two first terminals and two second terminals correspondingly; the shape of the covering is a rectangle, and the two first terminals and the two second terminals are respectively located at four top corners of the surface of the covering; the number of the connecting grooves is four, and the four connecting grooves are located at four top corners of the surface of the covering.

8. The battery covering structure with replaceable terminals according to claim 7, wherein the two first terminals are disposed at two adjacent corners of the surface of the covering, and the two second terminals are disposed at two adjacent corners of the surface of the covering.

* * * * *